US008345704B2

(12) United States Patent
Desai et al.

(10) Patent No.: US 8,345,704 B2
(45) Date of Patent: Jan. 1, 2013

(54) METHOD AND SYSTEM FOR MULTI-RADIO COEXISTENCE AND A COLLABORATIVE INTERFACE

(75) Inventors: Prasanna Desai, Olivenhain, CA (US);
Brima Ibrahim, Aliso Viejo, CA (US);
John Walley, Ladera Ranch, CA (US);
Gang Lu, Moraga, CA (US)

(73) Assignee: Broadcom Corporation, Irvine, CA (US)

( * ) Notice: Subject to any disclaimer, the term of this patent is extended or adjusted under 35 U.S.C. 154(b) by 845 days.

(21) Appl. No.: 11/950,559

(22) Filed: Dec. 5, 2007

(65) Prior Publication Data
US 2009/0147763 A1 Jun. 11, 2009

(51) Int. Cl.
*H04L 12/40* (2006.01)
(52) U.S. Cl. ............... 370/438; 370/462; 710/244
(58) Field of Classification Search .............. None
See application file for complete search history.

(56) References Cited

U.S. PATENT DOCUMENTS

| | | | | |
|---|---|---|---|---|
| 7,456,649 | B2 * | 11/2008 | Miyazaki | 326/27 |
| 7,668,565 | B2 * | 2/2010 | Ylanen et al. | 455/553.1 |
| 7,809,012 | B2 * | 10/2010 | Ruuska et al. | 370/449 |
| 2001/0014083 | A1 * | 8/2001 | Pulkkinen et al. | 370/280 |
| 2004/0048572 | A1 | 3/2004 | Godfrey | |
| 2007/0265034 | A1 | 11/2007 | Kasslin et al. | |
| 2008/0139212 | A1 * | 6/2008 | Chen et al. | 455/450 |

FOREIGN PATENT DOCUMENTS

| | | |
|---|---|---|
| CN | 1738310 | 2/2006 |
| EP | 1605643 | 12/2005 |
| WO | 0025449 | 5/2000 |
| WO | 2005122431 | 12/2005 |
| WO | 2007036687 | 4/2007 |

OTHER PUBLICATIONS

European Search Report, Sep. 5, 2012.

* cited by examiner

*Primary Examiner* — Kwang B Yao
*Assistant Examiner* — Alex Skripnikov
(74) *Attorney, Agent, or Firm* — Thomas | Horstemeyer, LLP

(57) ABSTRACT

Aspects of a method and system for multi-radio coexistence and a collaborative interface may include exchanging information between a plurality of radio transceivers integrated within a single device to enable coexistence, and coordinating sharing of transmit and receive resources between the plurality of radio transceivers by controlling access to the transmit and receive resources, where any one of the plurality of radio transceivers may be enabled to be selected to control the access based on the exchanged information. Selecting one of the radio transceivers for the controlling of the access band may be based on processing capability or priority of communication. The resources may comprise frequency bands, time slots, and antenna access. The information may be exchanged via a serial bus between the plurality of radio transceivers, where the serial bus may conform to an I2C (I-square-C) multi-master serial bus. Each of the radio transceivers may conform to one or more radio frequency technology.

21 Claims, 4 Drawing Sheets

METHOD AND SYSTEM FOR MULTI-RADIO COEXISTENCE AND A COLLABORATIVE INTERFACE

CROSS-REFERENCE TO RELATED APPLICATIONS/INCORPORATION BY REFERENCE

Not applicable

FIELD OF THE INVENTION

Certain embodiments of the invention relate to coexistence in communication systems. More specifically, certain embodiments of the invention relate to a method and system for multi-radio coexistence and a collaborative interface.

BACKGROUND OF THE INVENTION

Electronic communication has become prolific over the last decade. While electronic communication was initially limited to the desktop, recent trends have been to make communications, media content and the Internet available anytime, anywhere and, increasingly, on any device. Already now, it is quite common to find mobile devices such as cellular phones or Personal Digital Assistants (PDAs) that incorporate a large range of communication technologies and associated software. For example, fully-featured web-browsers, email clients, MP3 players, instant messenger software, and Voice-over-IP may all be found on some recent devices.

In this same spirit of the 'anytime, anywhere' paradigm, there is a drive towards making content stored on portable devices available to a large number of devices over a variety of radio frequency technologies. For example, many portable media devices may be enabled to provide a video output signal to a computer monitor or a television to allow display of, for example, digital photographs. For audio content, one possible output format may be a low-power FM transmission signal. Such integrated multi-purpose portable devices comprising multi-radio devices or components may interfere with each other.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for multi-radio coexistence and a collaborative interface, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for multi-radio coexistence and a collaborative interface. Aspects of the invention may comprise exchanging information between a plurality of radio transceivers integrated within a single device to enable coexistence, and coordinating sharing of transmit and receive resources between the plurality of radio transceivers by controlling access to the transmit and receive resources, where any one of the plurality of radio transceivers may be enabled to be selected to control the access based on the exchanged information.

Selecting one of the radio transceivers for the controlling of the access band may be based on processing capability or priority of communication. The resources may comprise frequency bands, time slots, and antenna access. The information may be exchanged via a serial bus between the plurality of radio transceivers, where the serial bus may conform to an Inter-Integrated Circuit (I²C) (I-square-C) multi-master serial bus. Each of the radio transceivers may conform to one or more radio frequency technologies. The exchanged information may comprise any combination of packet type, packet priority, start time of frame, end time of frame, node wireless technology specific information, transmit power level, received signal strength indicator, voice activity detection signaling, and sleep status indication. The priority of the plurality of radio transceivers may be assigned by appropriately choosing a device identity. The access may be controlled based on the exchanged information and a quality of service (QoS) requirement of one or more of the plurality of radio transceivers. Each of the plurality of radio transceivers may be a Wireless LAN transceiver, an Ultrawideband transceiver, a WiMAX transceiver, a cellular radio transceiver, a Bluetooth transceiver, a WiBro transceiver, or a ZigBee transceiver.

Figure 1:
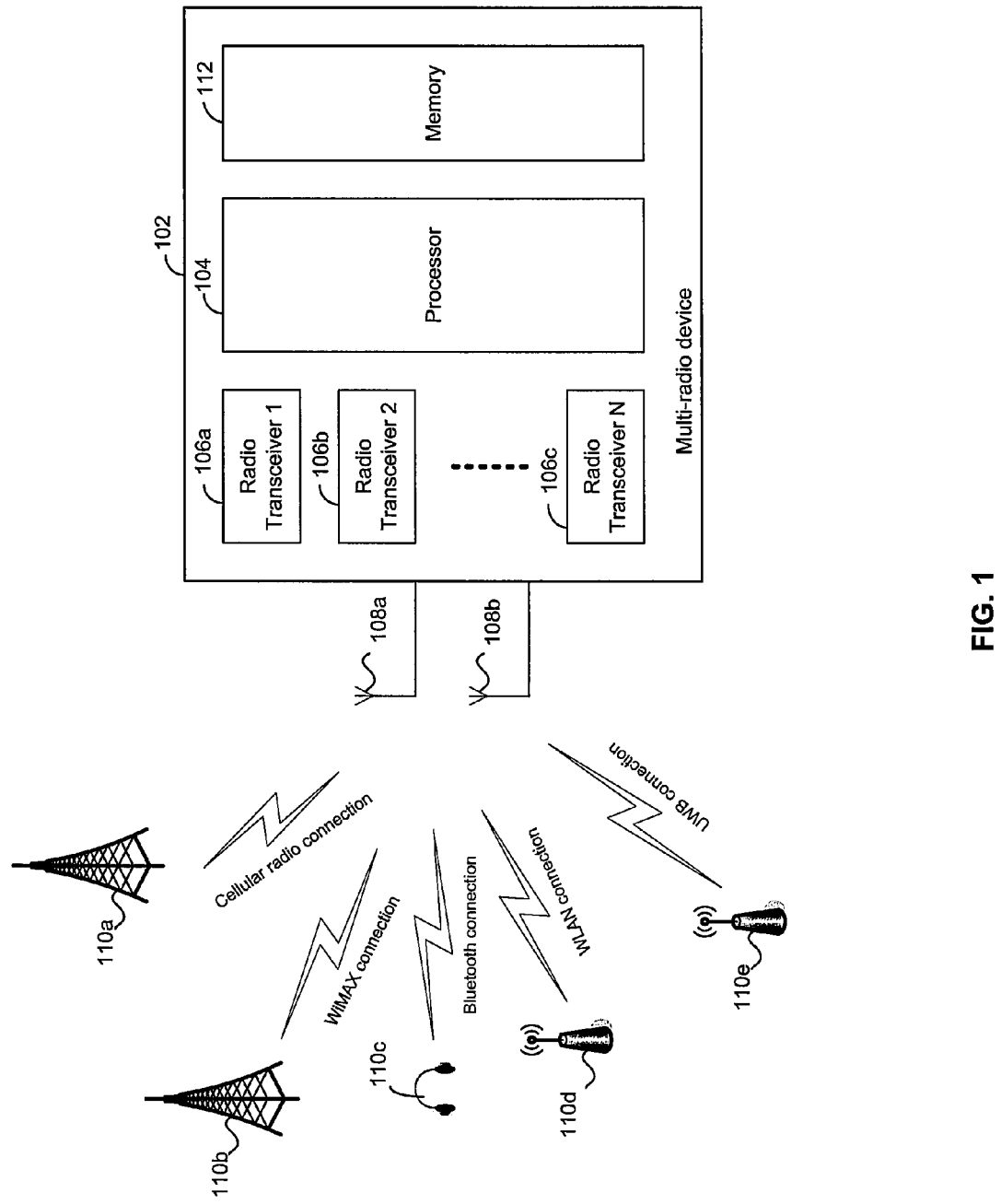
FIG. 1 is a block diagram illustrating an exemplary multi-radio system in accordance with an embodiment of the invention.

FIG. 1 is a block diagram illustrating an exemplary multi-radio system in accordance with an embodiment of the invention. Referring to FIG. 1, there is shown a multi-radio device 102, comprising a processor 104, a memory 112, and a plurality of radio transceivers, of which radio transceiver 106a, radio transceiver 106b, and radio transceiver 106c may be illustrated. The multi-radio device 102 may be communicatively coupled to one or more antennas, of which antennas 108a and 108b may be illustrated. There is also shown a cellular base station 110a, a WiMAX base station 110b, headphones 110c, a Wireless Local Area Network (WLAN) access point 110d, and an Ultra-Wideband (UWB) access point 110e.

The multi-radio device 102 may be enabled to generate and/or receive radio-frequency (RF) signals in accordance with one or more RF technologies. The multi-radio device 102 may be enabled to perform, for example, baseband signal processing in the processor 104. The processor 104 may comprise suitable logic, circuitry and/or code that may be enabled to perform a variety of signal processing tasks and may include controlling of the radio transceivers 106a through 106c, for example. The memory 112 may comprise suitable logic, circuitry and/or code that may be enabled to store data and/or code that may be accessed by the processor 104 and/or the radio transceivers 106a through 106c (1-N). The radio transceiver 106a may comprise suitable logic, circuitry and/or code that may be enabled to generate RF signals and intermediate frequency (IF) signals from baseband signals, which may be communicated from the processor, in accordance with a radio frequency technology and/or standard. In addition, the radio transceiver 106a may comprise suitable logic, circuitry and/or code that may be enabled to receive RF signals via one or more antennas, for example, antennas 108a and 108b, and convert the RF signals to baseband signals. The generated baseband signals may be desirably formatted for further processing in the processor 104, for example. The radio transceivers 106b through 106c (2-N) may be substantially similar to radio transceiver 106a but may operate in accordance with different radio technologies. The radio transceivers 106a through 106c (1-N) may, for example, generate and/or receive signals in accordance with cellular radio standards (UMTS, GSM, EDGE, HSDPA, EV-DO, CDMA 2000 and others), broadband standards (for example WiMAX IEEE 802.16, WiBro), and short-range communication standards (WLAN IEEE 802.11, UWB, Zig-Bee and others). In some instances, the radio transceivers 106a though 106c may be enabled to conform with multiple radio frequency technologies, for example when a radio transceiver may be a software-defined radio platform. The plurality of antennas communicatively coupled to the multi-radio device 102, for example antennas 108a and 108b, may be communicatively coupled to one or more radio transceivers 106a through 106c. Each radio transceiver may be communicatively coupled to at least one antenna, and some antennas may be shared between a plurality of radio transceivers. Each radio transceiver 106a through 106c may receive and/or transmit RF signals in accordance with an RF technology to/from another device, for example, the cellular base station basectation 110a, the WiMAX base station basectation 110b, the Bluetooth headphones 110c, the WLAN access point 110d, and/or the UWB access point 110e. In accordance with various embodiments of the invention, the components of the multi-radio device 102 may be implemented in a single chip, or with multiple chips and associated circuitry.

Figure 2:
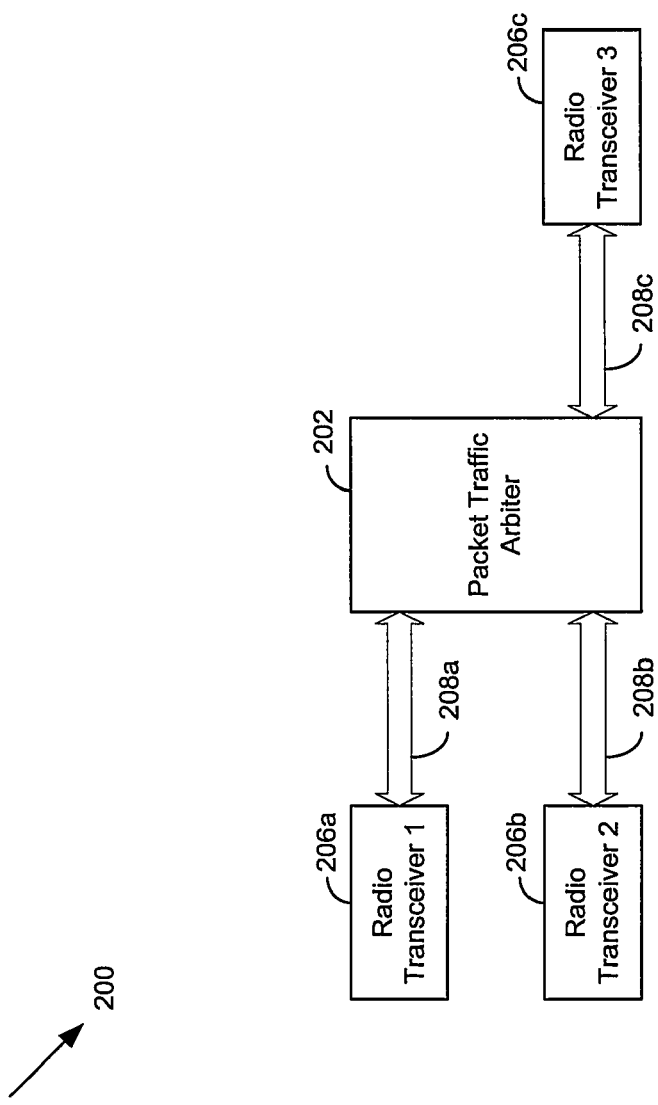
FIG. 2 is a block diagram illustrating an exemplary packet traffic arbitration system, in accordance with an embodiment of the invention.

FIG. 2 is a block diagram illustrating an exemplary packet traffic arbitration system, in accordance with an embodiment of the invention. Referring to FIG. 2, there is shown a packet traffic arbitration system 200 comprising a packet traffic arbiter 202, a plurality of radio transceivers, of which radio transceiver 206a through 206c (1-3) may be illustrated. There is also shown communication links 208a, 208b, and 208c.

The packet traffic arbiter 202 may comprise suitable logic, circuitry and/or code that may be enabled to control traffic flow and/or access to the radio resources of a plurality of radio transceivers in a system. The radio transceivers 206a, 206b, and 206c may be substantially similar to the radio transceivers in FIG. 1. The communication links 208a, 208b and 208c may comprise suitable logic, circuitry and/or code that may be enabled to permit communications between radio transceivers and the packet traffic arbiter (PTA).

In multi-radio systems as illustrated in FIG. 1, the radio transceivers may often be physically co-located. Some radio transceivers may operate in the same or similar frequency bands. Table 1 may show some exemplary radio technologies and their associated frequency bands:

TABLE 1

Exemplary frequency bands

| Wireless Technology | Frequency Band |
|---|---|
| Cellular: | |
| CDMA/GPRS | 824-894 MHz, 800-960 MHz, 1170-1880 MHz, 1850-1900 MHz |
| W-CDMA/UMTS | 2110-2170 MHz |
| EDGE | 824-960 MHz, 1710/1990 MHz |
| HSDPA | 2110-2170 MHz |
| Bluetooth 2.0 | 2.402-2.480 GHz |
| UWB (and Bluetooth 3.0) | 3.6-10.1 GHz |
| WiFi (IEEE 802.11a/b/g/n) | 2.4 GHz, 5.15-5.825 GHz |
| WiMAX/WiBro (IEEE 802.16a) | 2.3 GHz, 2.5 GHz, 3.3-3.8 GHz |
| FM | 76-108 MHz |
| GPS | 1.2 GHz, 1.5-1.6 GHz |
| DVB-H TV | 1.6-1.7 GHz |

In some instances, radio transceivers may interfere with each other because of simultaneous or nearly simultaneous operation, and/or because one radio transceiver may desire to transmit while another radio transceiver may desire to receive, for example. In these instances, it may be desirable to implement some centralized traffic control that may help to avoid interference and hence errors, that may lead to lost packets.

Some solutions to assist in interference avoidance may exist, for example the 2-wire interface, the 3-wire interface, and the 4-wire interface. In some instances, these wire interfaces may be proprietary. The wire interfaces may, however, only work for two radio transceivers and may be used to improve Bluetooth-WLAN coexistence and/or antenna sharing in some instances. The 3-wire interface, for example, may be used for Bluetooth-WLAN coexistence, in accordance with the IEEE 802.15.2 Recommended Practice. The 2-wire and 3-wire interface techniques may not permit to transmit sophisticated data management data to a centralized management device and may be limited to blocking the resource access of one device while a transmission, for example, may be taking place on the other device.

In accordance with various embodiments of the invention, the PTA 202 may exchange information with the radio transceivers 206a, 206b, and 206c via the communication links 208a, 208b, and 208c. The information exchanged may be used by the PTA 202 to coordinate receiving and transmitting activities by the radio transceivers, for example radio transceivers 206a, 206b, and 206c. By exchanging desirable information between the radio transceivers and the PTA 202, the PTA 202 may employ coordination algorithms that may reduce or eliminate traffic collisions and increase efficiency. In some instances, coordination may aid in making handover decisions, for example in deciding to handover a phone call from a cellular radio transceiver to a Voice-over-IP (VOIP) call via a short-range radio transceiver, for example WLAN. A further benefit may be coordination of low-power activities by the radio transceivers. For example, scanning the spectrum for nearby nodes, or sending periodic messages to a nearby access point and/or basestation, or receiving broadcast information may be achieved more efficiently by the radio transceivers if they are coordinated. A reduction in interference for such low-power activities, as well as in active transmission and reception activities may reduce power consumption and increase battery life, for example stand-by times. In some instances, by judiciously selecting desirable radio transceiver combinations and parameters, it may be possible, for example, to receive Bluetooth frames concurrently with the transmission of WLAN acknowledgement (ACK) packets, by selecting desirable transmit power levels.

Figure 3:
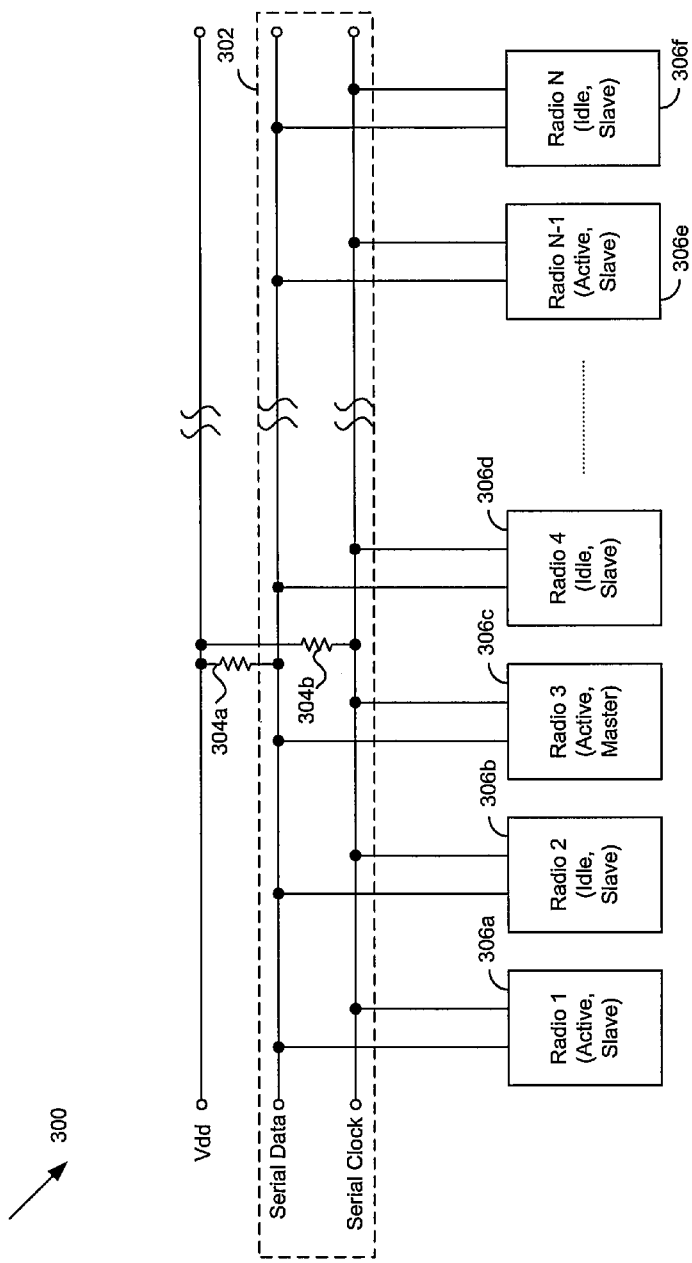
FIG. 3 is a block diagram illustrating an exemplary implementation of a multi-radio coexistence system, in accordance with an embodiment of the invention.

FIG. 3 is a block diagram illustrating an exemplary implementation of a multi-radio coexistence system, in accordance with an embodiment of the invention. Referring to FIG. 3, there is shown a coexistence system 300 comprising a serial bus 302 and a plurality of radio transceivers, of which radio transceivers 306a through 306f may be illustrated. The serial bus 302 may comprise a serial data line and a serial clock line. The serial data line may be coupled to a supply voltage Vdd via a pull-up resistor 304a, and the serial clock line may be coupled to the supply voltage Vdd via a pull-up resistor 304b.

The plurality of radio transmitters, for example radio transceivers 306a through 306f, may comprise suitable logic, circuitry and/or code that may be enabled to generate RF signals and intermediate frequency (IF) signals from baseband signals that may be communicated from the processor, in accordance with a radio frequency technology and/or standard. In addition, the radio transceivers 306a through 306f, for example, may be enabled to communicate to each other and, in some instances, to other devices via the serial bus 302.

In most instances, it may be desirable that any one radio transceiver, for example, any one of radio transceivers 306a through 306f may be a packet traffic arbiter (PTA), in accordance with the needs in the system. In this regard, the PTA may be chosen from among the active nodes. In some instances, the PTA may be an inactive radio transmitter that may have sufficient extra processing power to coordinate among the plurality of radio transceivers. The PTA node, for example radio transceiver 306c, as illustrated in FIG. 3, may coordinate the activities of the plurality of radio transceivers to minimize the interference between them. In one embodiment of the invention, access to the radio spectrum may be controlled on a time slot basis by the PTA (Time Division Multiple Access, for example). In another embodiment, access to spatial resources, for example the antennas 108a and 108b, and/or frequency bands may be controlled. In general, the PTA may control access to any available radio resources. The access may be granted on any number of performance and/or priority criteria, for example, required Quality-of-Service (QoS).

In order to achieve efficient resource sharing, the PTA may receive desirable and appropriate information from the other nodes, for example the radio transceivers 306a through 306f. In accordance with various embodiments of the invention, the parameters that may be exchanged may comprise, but are not limited to, packet type, packet priority, start time of frames, end time of frames, desired/current transmit power level, current received signal strength indication (RSSI), voice activity detection signaling, node wireless technology specific information, and/or sleep status indicator. For example, for a Bluetooth-enabled radio transceiver, the radio transceiver may support common connection types and associated packet types. For example, synchronous connection-oriented (SCO) logical transport connections, extended SCO (eSCO) logical transport connections, and/or asynchronous connection oriented (ACL) logical transport connections. In the example of Bluetooth, node wireless technology specific information may comprise information that indicated whether the radio transceiver may be operating in a master or slave role, the current hopping frequency and what the next hopping frequency may be, the inquiry mode and similar information.

As mentioned above, it may be desirable that one of a plurality of radio transceivers in a multi-radio system may take the role of PTA. As illustrated in FIG. 3, this may be, for example, radio transceiver 306c. At another instance in time, this may be another radio transceiver, for example chosen from among the radio transceivers 306a through 306f. A serial bus where multiple master nodes may be present may be referred to as a multi-master bus. In accordance with one embodiment of the invention, an exemplary serial bus 302 may be implemented as an $I^2C$ (I-square-C) serial bus, which may inherently be a multi-master bus. As illustrated in FIG. 3, the $I^2C$ serial bus 302 may comprise a serial data line and a serial data clock that may be communicatively coupled to a plurality of radio transceivers 306a through 306f in order to permit the exchange of information as described above. At the physical layer, both the serial data line and the serial clock line may be implemented in an open-drain design and may require biasing resistors. Biasing may be provided by the pull-up resistors 304a and 304b. The pull-up resistors 304a and 304b may ensure that the lines, when left floating, are maintained at voltage Vdd, which may correspond to a logic one/high state. Signaling on the $I^2C$ serial bus 302 may correspondingly be achieved by pulling-down a line to a logical zero, and this may be used as a means of channel access. A sleeping node, for example, radio transceiver 306b, will simply not do anything and hence let the line float at logic one. In accordance with various embodiments of the invention, other desirable bus designs may be substituted for the $I^2C$ serial bus 302.

Figure 4:
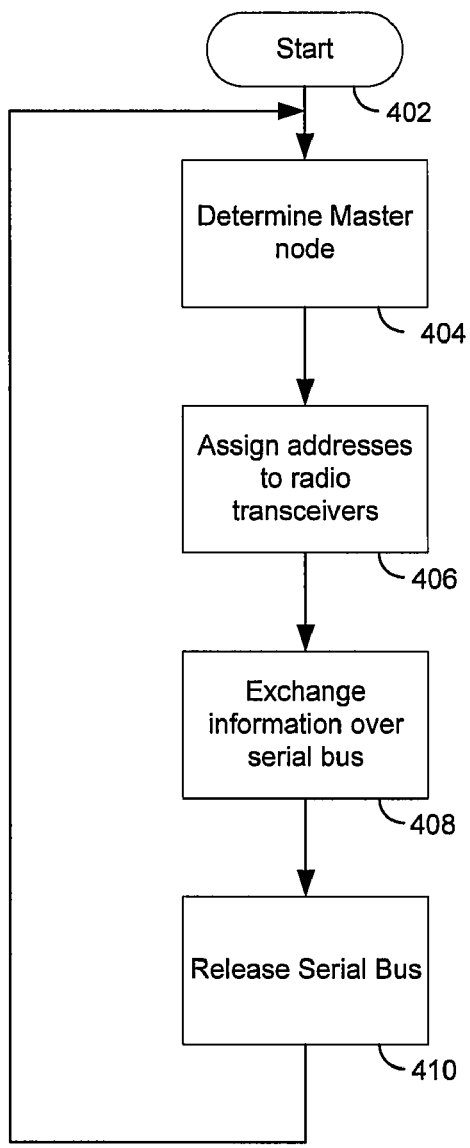
FIG. 4 is a flow chart of an exemplary multi-radio coexistence system, in accordance with an embodiment of the invention.

FIG. 4 is a flow chart of an exemplary multi-radio coexistence system, in accordance with an embodiment of the invention. After initializing the algorithm in step 402, a master node may be determined according to desirable priority characteristics among the radio transceivers, for example, radio transceivers 306a through 306f as illustrated in FIG. 3. In instances where an $I^2C$ serial bus, for example serial bus 302, may be used, priority among the radio transceivers in the system may be established based on their device address. A basic $I^2C$ protocol may be such that a lower device address may have higher access priority to the bus than a higher device address. Hence, the radio transceivers in the system may be prioritized accordingly, for example on the basis of required quality of service. In step 406, the radio transceivers may be assigned device addresses and, in step 408, exchange of data may then take place among the radio transceivers via the serial bus, for example serial bus 302. If, or when, the traffic priorities among the radio transceivers may change, the radio transceivers may release the bus and start over the assignment of addresses in accordance with the above steps in step 410.

In accordance with an embodiment of the invention, a method and system for multi-radio coexistence and a collaborative interface may comprise exchanging information between a plurality of radio transceivers, for example radio transceivers 106a through 106c, integrated within a single device, for example multi-radio device 102, to enable coexistence, and coordinating sharing of transmit and receive resources between the plurality of radio transceivers, for example radio transceiver 106a through 106c, by controlling access to the transmit and receive resources, wherein any one of the plurality of radio transceivers, for example radio transmitter 306c or packet traffic arbiter 202, may be enabled to be selected to control the access based on the exchanged information.

Selecting one of the radio transceivers for the controlling of the access band may be based on processing capability or priority of communication, as described for FIG. 3. The resources may comprise frequency bands, time slots, and antenna access.

The information may be exchanged via a serial bus 302 between the plurality of radio transceivers, for example radio transceivers 306a through 306f, wherein the serial bus may conform to an $I^2C$ (I-square-C) multi-master serial bus, as illustrated for FIG. 3. Each of the radio transceivers may conform to one or more radio frequency technology. The exchanged information may comprise any combination of packet type, packet priority, start time of frame, end time of frame, node wireless technology specific information, transmit power level, received signal strength indicator, voice activity detection signaling, and sleep status indication, as described for FIG. 3. The priority of the plurality of radio transceivers may be assigned by appropriately choosing a device identity, for example based on priority and numerical value, as described for FIG. 3. The access may be controlled based on the exchanged information and a quality of service (QoS) requirement of one or more of the plurality of radio transceivers, for example radio transceivers 306a through 306f. Each of the plurality of radio transceivers may be a Wireless LAN transceiver, an Ultrawideband transceiver, a WiMAX transceiver, a cellular radio transceiver, a Bluetooth transceiver, a WiBro transceiver, or a ZigBee transceiver.

Another embodiment of the invention may provide a machine-readable storage, having stored thereon, a computer program having at least one code section executable by a machine, thereby causing the machine to perform the steps as described herein for multi-radio coexistence and a collaborative interface.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
 exchanging, via a single serial bus that couples a plurality of radio transceivers integrated within a single device, information directly from a first one of said plurality of radio transceivers to a second one of said plurality of radio transceivers to enable coexistence;
 selecting a master one of said plurality of radio transceivers, wherein any one of said plurality of radio transceivers is capable of being selected; and
 coordinating sharing of transmit and receive resources between or among said plurality of radio transceivers by said master one of said plurality of radio transceivers controlling access of said plurality of radio transceivers to said transmit and receive resources based at least in part on said exchanged information and a quality of service requirement associated with at least one of said plurality of radio transceivers;
 wherein selecting said master one of said plurality of radio transceivers is based on priority of communication.

2. The method according to claim 1, comprising selecting said master one of said plurality of radio transceivers based on processing capability priority of communication.

3. The method according to claim 1, wherein said resources comprise frequency bands, time slots, and antenna access.

4. The method according to claim 1, comprising exchanging said information via said single serial bus in one or more open-drains between or among said plurality of radio transceivers.

5. The method according to claim 4, wherein said single serial bus conforms to an $I^2C$ (I-square-C) multi-master serial bus.

6. The method according to claim 1, wherein each of said radio transceivers conforms to one or more radio frequency technologies.

7. The method according to claim 1, wherein said exchanged information comprises any combination of packet type, packet priority, start time of frame, end time of frame, node wireless technology specific information, transmit power level, received signal strength indicator, voice activity detection signaling, and sleep status indication.

8. The method according to claim 1, wherein a priority of said plurality of radio transceivers is assigned by appropriately choosing a device identity.

9. The method according to claim 1, wherein each of said plurality of radio transceivers is a Wireless LAN transceiver, an Ultrawideband transceiver, a WiMAX transceiver, a cellular radio transceiver, a Bluetooth transceiver, a WiBro transceiver, a GPS transceiver, or a ZigBee transceiver.

10. A system for processing communication signals, the system comprising:
 one or more circuits, said one or more circuits are operable to:
 exchange, via a single serial bus that couples a plurality of radio transceivers integrated within a single device, information directly from a first one of said plurality of radio transceivers to a second one of said plurality of radio transceivers to enable coexistence;
 select a master one of said plurality of radio transceivers, wherein any one of said plurality of radio transceivers is capable of being selected; and
 coordinate the sharing of transmit and receive resources between or among said plurality of radio transceivers by said master one of said plurality of radio transceivers controlling access of said plurality of radio transceivers to said transmit and receive resources based on said exchanged information and a quality of service requirement associated with at least one of said plurality of radio transceivers.

11. The system according to claim 10, wherein said one or more circuits are operable to select said master one of said plurality of radio transceivers based on processing capability and priority of communication.

12. The system according to claim 10, wherein said resources comprise frequency bands, time slots, and antenna access.

13. The system according to claim 10, wherein said one or more circuits are operable to exchange said information via said single serial bus in one or more open-drains between or among said plurality of radio transceivers.

14. The system according to claim 13, wherein said single serial bus conforms to an I²C (I-square-C) multi-master serial bus.

15. The system according to claim 10, wherein each of said radio transceivers conforms to one or more radio frequency technologies.

16. The system according to claim 10, wherein said exchanged information comprises any combination of packet type, packet priority, start time of frame, end time of frame, node wireless technology specific information, transmit power level, received signal strength indicator, voice activity detection signaling, and sleep status indication.

17. The system according to claim 10, wherein a priority of said plurality of radio transceivers is assigned by appropriately choosing a device identity.

18. The system according to claim 10, wherein each of said plurality of radio transceivers is a Wireless LAN transceiver, an Ultrawideband transceiver, a WiMAX transceiver, a cellular radio transceiver, a Bluetooth transceiver, a WiBro transceiver, a GPS transceiver, or a ZigBee transceiver.

19. A method for processing communication signals, the method comprising:
  selecting a master one of a plurality of radio transceivers integrated within a single device based on desirable priority characteristics established among said plurality of radio transceivers to control access to transmit and receive resources between said plurality of radio transceivers, wherein any one of said plurality of radio transceivers is capable of being selected;
  exchanging, via a single serial bus that couples said plurality of radio transceivers integrated within said single device, information directly from a first one of said plurality of radio transceivers to a second one of said plurality of radio transceivers to enable coexistence; and
  coordinating sharing of said transmit and receive resources between or among said plurality of radio transceivers by controlling, via said master one of said plurality of radio transceivers, said access of said plurality of radio transceivers to said transmit and receive resources based on said exchanged information and a quality of service requirement associated with at least one of said plurality of radio transceivers;
  wherein selecting said master one of said plurality of radio transceivers is based on priority of communication.

20. A system for processing communication signals, the system comprising:
  one or more circuits, said one or more circuits being operable to:
  select a master one of a plurality of radio transceivers integrated within a single device based on desirable priority characteristics established among said plurality of radio transceivers to control access to transmit and receive resources between said plurality of radio transceivers, wherein any one of said plurality of radio transceivers is capable of being selected;
  exchange, via a single serial bus that couples said plurality of radio transceivers integrated within said single device, information directly from a first one of said plurality of radio transceivers to a second one of said plurality of radio transceivers to enable coexistence; and
  coordinate sharing of said transmit and receive resources between or among said plurality of radio transceivers by controlling, via said master one of said plurality of radio transceivers, said access of said plurality of radio transceivers to said transmit and receive resources based on said exchanged information and a quality of service requirement associated with at least one of said plurality of radio transceivers;
  wherein said one or more circuits are operable to select said master one of said plurality of radio transceivers based on priority of communication.

21. A system for processing communication signals, the system comprising:
  means for exchanging information directly from a first one of a plurality of radio transceivers to a second one of said plurality of radio transceiver to enable coexistence;
  means for selecting a master one of said plurality of radio transceivers, wherein any one of said plurality of radio transceivers is capable of being selected;
  means for coordinating the sharing of transmit and receive resources between or among said plurality of radio transceivers by said master one of said plurality of radio transceivers controlling access of said plurality of radio transceivers to said transmit and receive resources based at least in part on said information that has been exchanged and a quality of service requirement associated with at least one of said plurality of radio transceivers; and
  a single serial bus that couples the plurality of radio transceivers integrated within a single device;
  wherein selecting said master one of said plurality of radio transceivers is based on priority of communication.

* * * * *

UNITED STATES PATENT AND TRADEMARK OFFICE
CERTIFICATE OF CORRECTION

PATENT NO. : 8,345,704 B2  
APPLICATION NO. : 11/950559  
DATED : January 1, 2013  
INVENTOR(S) : Desai et al.

Page 1 of 1

It is certified that error appears in the above-identified patent and that said Letters Patent is hereby corrected as shown below:

In the Claims

Column 8, line 16, claim 2, after the word "capability", delete the word "or" and replace with the word --and--.

Column 8, line 63, claim 10, delete the "." and insert --;--.

Column 8, line 64, claim 11, insert the words --wherein said one or more circuits are operable to select said master one of said plurality of radio transceivers based on priority of communication--.

Signed and Sealed this  
Twenty-second Day of October, 2013

Teresa Stanek Rea  
*Deputy Director of the United States Patent and Trademark Office*